United States Patent [19]

Rossi

[11] Patent Number: 4,983,915

[45] Date of Patent: Jan. 8, 1991

[54] DEVICE FOR DETERMINING THE ROTARY ANGLE POSITION OF ROTARY DRIVES OF ELECTRICAL MACHINES BY EVALUATION OF ELECTRICAL VOLTAGES BY SENSORS RESPONDING TO ROTARY MOVEMENTS

[76] Inventor: Lothar Rossi, In den Steinen 12, D-7302 Ostfildern 2, Fed. Rep. of Germany

[21] Appl. No.: 181,927

[22] Filed: Apr. 15, 1988

[30] Foreign Application Priority Data

Apr. 18, 1987 [DE] Fed. Rep. of Germany ....... 3713304

[51] Int. Cl.[5] .......................... G01B 7/30; G01P 3/488; H01F 5/00
[52] U.S. Cl. ........................... 324/207.17; 324/207.22; 324/207.25; 324/173
[58] Field of Search .............. 324/207, 208, 160, 162, 324/163–167, 173, 174, 175, 176, 178, 179, 207.17, 207.22, 207.25

[56] References Cited

U.S. PATENT DOCUMENTS

| | | | |
|---|---|---|---|
| 3,090,933 | 5/1963 | Henry-Baudot | 336/79 X |
| 3,205,485 | 9/1965 | Noltingk | 324/207 X |
| 3,611,813 | 10/1971 | Brocker | 324/173 X |
| 3,742,340 | 6/1973 | Kiedrowski | 324/208 X |
| 3,995,156 | 11/1976 | Angersbach et al. | 324/175 X |
| 4,013,911 | 3/1977 | Fujiwara et al. | 324/208 X |
| 4,156,192 | 5/1979 | Schedrovitsky et al. | 324/208 |
| 4,293,837 | 10/1981 | Jaffe et al. | 324/208 X |
| 4,507,638 | 3/1985 | Brosh | 336/79 |

FOREIGN PATENT DOCUMENTS

2407240 7/1975 Fed. Rep. of Germany .
1484796 9/1977 United Kingdom .

Primary Examiner—Reinhard J. Eisenzopf
Assistant Examiner—Warren S. Edmonds
Attorney, Agent, or Firm—Darby & Darby

[57] ABSTRACT

A device for determining the rotary-angle position of rotary drives which can also determine the rotary speed. A magnet rotor generating a rotating magnetic field is provided for the purpose of determining the rotary speed with a cam disc suited for screening magnetic field lines, and to arrange coacting inductive transmitter and receiver heads on both sides of the cam disc, for determining the rotary-angle position. Due to the fact that the electromagnetic radiation emitted by the transmitter head is screened, the output signal of the receiver heads obtained is an envelope-modulated signal which can be evaluated for determining the position, for example by phase comparisons with additional envelope-modulated output signals of other receiver heads. The axial magnetization lines emanating simultaneously from the magnet rotor serve for inducing electric voltages in flat coils arranged axially before the magnet rotor, in overlapping annular shape.

24 Claims, 3 Drawing Sheets

DEVICE FOR DETERMINING THE ROTARY ANGLE POSITION OF ROTARY DRIVES OF ELECTRICAL MACHINES BY EVALUATION OF ELECTRICAL VOLTAGES BY SENSORS RESPONDING TO ROTARY MOVEMENTS

BACKGROUND OF THE INVENTION

Methods for determining the position of rotary parts of rotary drives of any kind, for example and in particular of rotors of electric machines, have been largely known and serve, for example in the case of certain electric machines, which generally can be regarded as synchronous machines and may be described, from the functional point of view, as sort of brushless d.c. motors—to mention only one preferred embodiment, although the present invention is by no means restricted to it—to excite certain predetermined coils for the purpose of generating corresponding magnetic fields so as to set the rotor of the machine into continuous rotation. It is understood that the respective coils are, therefore, excited in rapid succession and of course in a manner tuned to the desired rotary speed of the electric motor, it being, however, in any case indispensable to have at least relative knowledge of the rotary-angle position.

By "relative" it is to be understood in this connection that depending on the number of poles of the electric motor, certain structures will occur in repetition so that certain predetermined coils which are distributed over the stator part can be excited simultaneously.

However, there have also been known means for determining the position of rotary parts where an absolute position has to be determined, for example the upper dead center of internal combustion machines, because this angular position serves as reference for the injection times of diesel engines or for the entire ignition timing curve, depending on the operating mode of the internal-combustion machine. Such singular absolute positions can be determined by marks provided on a rotating wheel, including a toothed wheel, in which case an inductive approximation switch responds when an iron part forming this mark approaches the switch.

Considering, however, that great value is also placed on obtaining an actual-value signal for the rotary speed, in particular in connection with the determination of the rotor position of electric motors, tachogenerators have been known in the art in a broad range of forms, depending on the requirements placed on their accuracy. Such tachogenerators may, for example, take the form of incremental-value pickups, Hall generators or optoelectric means responding to the passage of rotary parts covering them.

According to another possibility, rotary speeds of rotary parts are determined by counting tooth-like projections arranged at the periphery of a rotary part, for example the teeth of the clutch ring of an internal combustion engine, in which case the respective speed may be represented in the form of a pulse sequence or of a corresponding counter reading.

Usually, and in most cases necessarily, such tachogenerators have associated to them a plurality of additional processing circuit components which serve, for example, for linearizing, amplifying or preparing the signals so obtained for further processing, for example for speed regulation. This is necessary because the useful level gained is very low in most of the cases and one cannot, therefore, do without such supplementary electronic means.

Now, it is the object of the present invention to provide quite generally a device for determining the rotary-angle position of rotary drives, preferably improved by the addition of supplementary means for recording the rotary speed (tachogenerator), which is of simple design and provides an image of the rotor position in the form of an analogue curve the shape of which can be determined at desire.

Considering that the present invention finds its practical implementation preferably in connection with a tachogenerator, where the driven magnet rotor and flat coils picking up the magnetic field emanating from the rotor are arranged in axial layers, it should be noted that it already has been known in a different context, in connection with an inductor for rotary electric machines (AT-PS 219 701) to build up a stationary magnet system and a rotor supplying rotary energy in axial layers in which case flat windings and laminar conductors are arranged on the rotor. Due to the arrangement in axial layers, a plane air gap is obtained between the rotor and the stator parts. The stator part comprises a plurality of permanent magnets each of which is connected in parallel, via a common yoke, to a magnetic subsidiary circuit comprising an electric excitation winding. The parallel subsidiary circuits, therefore, contribute very specially towards generating the inductor flux of the machine when the excitation winding is excited, while a magnetic short-circuit is produced for the respective permanent magnet of the stator part when the excitation winding is interrupted. There do not exist any relationships to the present invention.

ADVANTAGES OF THE INVENTION

The device according to the invention for determining the rotary-angle position achieves the above object with the aid of the characterizing features of the main claim and provides the advantage that envelope curve shapes defining the respective rotary movement and rotary position can be gained practically alone from the geometric structure, arrangement and design of a driven, rotating cam disk and coacting sensors consisting each of oppositely arranged inductive transmitter and receiver heads. The analogue shape of the envelope curves that have been generated by modulation of a higher-frequency unmodulated transmitter signal received by magnetic coupling of inductive receiver heads, can be influenced, and conveniently adapted to specific applications, by giving a cam disk a corresponding shape, the cam disk being in this case the driven rotary part which has to be adapted to the number of poles and/or phases presented by the driving electric machine or the incorporated tachogenerator.

Preferably, a predetermined number of inductive sensors, each comprising transmitter and receiver heads, are provided and arranged in the marginal area of the driven cam disk in such a manner that, related to a predetermined angular position, the system assumes at any given time, in steady transition, a state where one pair of transmitter/receiver heads is masked (screened), another one is partially masked (partially screened) and a third one is released for receiving freely the emitted higher-frequency electromagnetic signal.

According to an advantageous improvement of the invention, the cam disk which consists of iron or another magnetically permeable material and which acts to screen the inductive sensors in succession, is seated on the rotor of the tachogenerator.

It is possible in this manner, by evaluating and comparing the output signals supplied by the receiver heads, which now have been modulated by the rotation of the rotor and the effect of the cam disk, to determine the respective rotor position of the driving electric machine, at least for certain relative positions at which, for example, predetermined coils can be excited, which coils may be distributed over the periphery in repeated arrangement, depending on the number of poles of the machine. This determination of the position is of course of importance also in connection with the tachogenerator so that it is also possible to select and cut out roof sections from the electric EMF signals of the tachogenerator coils by evaluating the positional signals.

The features specified by the sub-claims permit advantageous improvements and further developments of the invention defined by the main claim. A particular advantage is seen in the fact that the overall structure, namely the tachogenerator and the position-determining system, is free from any iron, which means that the system operates without any yoke structures. Accordingly, no iron back-shunt is required for the magnetization lines produced by the rotor of the tachogenerator, which takes the form of a special permanent magnet, so that no distortions, dissymmetries, or the like normally resulting from hysteretic effects are encountered.

It is, therefore, possible in an advantageous manner to design a collector-less d.c. tachogenerator with a system for determining the rotary-angle position of the rotor, which provides particularly high accuracy and whose high useful output level is free from waviness, dissymmetries, interfering and side effects and linearized up to the percentage range, and this practically merely by the particular geometric structures and arrangement of the magnets belonging to and/or forming the rotor, and of the coils.

According to an advantageous improvement of the invention, the invention therefore succeeds, thanks to its special mechanical arrangement which also includes the particular shape of the coils used, in producing output signals tuned to the curves of the magnetization lines of the rotor which are suited for further processing, usually for use for regulating purposes, without extensive electronic corrections and preparation.

The main reason for this is seen in the fact that the EMF emitted by the individual coils exhibit a straight roof shape, with the individual levels providing a direct measure for the rotary speed of the machine. The roof curve is perfectly linear, straight and free from any waviness or other dissymmetries or disturbing influences, except that one may, as sometimes usual in connection with tachogenerators, select from the voltages supplied by the coil desirable sections for further processing, for example by fixing electronic thresholds and by suitable selection measures. In the case of the present invention, it can be the question only of selecting sections of the anyway linear and straight roof curves so that one only has to define the point in time at which the roof curve is to be clipped in the generally alternating output signal of the individual coil.

The individual coils of the tachogenerator operate in the manner of a multi-phase system, preferably a three-phase a.c. system, thus forming three output voltages set off by 120°, which preferably exhibit at least partially over-lapping roof curves, so that by forming the before-described sections as described above, a continuous d.c. voltage can be obtained as output signal of the tachogenerator.

Another advantage of the present invention resides in the fact that a differential transmitter system can be provided by arranging two stationary coil carrier disks with correspondingly designed and positioned coils, in which case one of the coil carrier disks, with the coils mounted thereon, may be arranged axially on the one side of the rotor/permanent magnet and the other one on the other side thereof, in axial layers, relative to the driving shaft and/or the rotor of the tachogenerator. Such a differential transmitter arrangement suppresses axial displacements of the rotor which otherwise would result in variations of the measuring results; by connecting the coils on each side of the magnet rotor appropriately, it is possible to absorb any axial displacements, which may be due for example to an increase in length of the driving shaft of the electric machine equipped with such a tachogenerator. In addition, the differential arrangement ensures that any dissymmetries, that may possibly result from the sense of rotation, are suppressed in the output voltages of the coils as the beginning and the end of each coil can be connected on both sides of the magnet rotor in such a manner that any influences resulting from the sense of rotation are balanced out.

Finally, a particularly advantageous improvement of the present invention is obtained :;hen the individual tachogenerator coils, which overlap each other in the form of a circle, have a basic trapezoidal shape and the two oblique sides of the trapezoidal shapes of all coils arranged on the coil carrier disk form together the spokes of a wheel, while the longer side of the trapezoid provides particularly well suited correction means for influencing the shape of the measuring voltage supplied by each individual coil, and finally by all coils together, and this especially as regards the before-mentioned roof curve. By including these coil webs, which are formed by the base lines of the trapezoid and which normally extend either in the direction of, or in opposite direction to, the moving magnetic lines, into the active magnet area, at least partially, and forming them simultaneously in a special manner—whereby voltage components evaluated for correction purposes are induced also in the coil webs formed by those base lines and constituting the outer periphery of the wheel in the completed structure—it is possible altogether to influence the curve shape of the voltage supplied by each coil so that the desired roof curve shapes are obtained.

BRIEF DESCRIPTION OF THE DRAWING

Certain embodiments of the invention will now be described with reference to the drawing in which.

DESCRIPTION OF THE EMBODIMENTS

It is the basic idea of the present invention that at least one inductive sensor in the form of an inductive transmitter head and an associated and properly adjusted receiver head is arranged in the area of a rotating cam disk in such a manner that the cam disk leads to the electromagnetic flux emitted by the transmitter head being screened from time to time relative to the receiver head so that the electro-magnetic radiation picked up by the receiver head and converted into an electric output signal is modulated according to the rotary movement and at the same time according to the structural shape and design of the cam disk, in the form of an envelope curve signal providing an instantaneous image of the momentaneous positions of the rotary part, representing at the same time an analog signal that can be varied at desire, and enabling simultaneously, in connection with the output envelope curve signals of other inductive sensor heads, the exact angular positions to be determined, for example, by phase comparisons, while supplying also information regarding the sense of rotation.

If only one inductive sensor head is used, at least the relative rotor position can be determined by threshold means, by comparing the continuous variation or modulation of the envelope with such threshold means.

According to a further improvement of the present invention, these means for determining the rotary-angle position of a rotating part are combined with means for determining the rotary speed, i.e. a tachometer, to form one single component which then simultaneously supplies a very exact linearized d.c. output signal proportional to the rotary speed and the modulated envelope signals of the inductive sensors. These signals can be evaluated for determining the rotary position.

According to one particular embodiment of the invention, the envelope signal may be used as auxiliary commutation characteristic, in which case it serves as reference input for controlling corresponding coils of a driving electric motor via a current regulator, it being possible in this case, due to the possible analog determination of the shape of the envelope curve, to provide for certain deviations from a special sinusoidal control signal by giving the cam disk an appropriate shape, so that any distortions caused in the electric motor by the magnets and the magnetic fields involved can be accounted for.

Another embodiment of the present invention consists in the fact that flat coils of trapezoidal shape, resembling the spokes of a wheel, are provided, preferably in overlapping arrangement, for picking up the rotary speed and that a driven, rotating magnet rotor is provided in axially layered arrangement, which means that it occupies a position in front of the flat coils, viewed in the axial direction, and that, in the driven state, its magnetization lines which are likewise mainly emitted in the axial direction intersect the coil windings, initially primarily those windings which form the spokes of the wheel, in the wheel-type overall design of the coils. This structure is obtained without any guiding means for the magnetization lines in the form of yokes, iron parts, or the like.

One embodiment of the invention provides in addition an important possibility of correcting the EMF emitted by the trapezoidal coils by means of the respective coil webs formed by the base lines of the trapezoid, which are likewise arranged within the active magnetic area, i.e. in the area where magnet lines emitted by the rotating rotor are still encountered. These top or baseline coil webs are subjected to special shaping measures after winding of the coils, which then already exhibit the basic trapezoidal shape, for the purpose of obtaining optimum correction results regarding the roof curve shapes of the emitted voltages.

Figure 1:
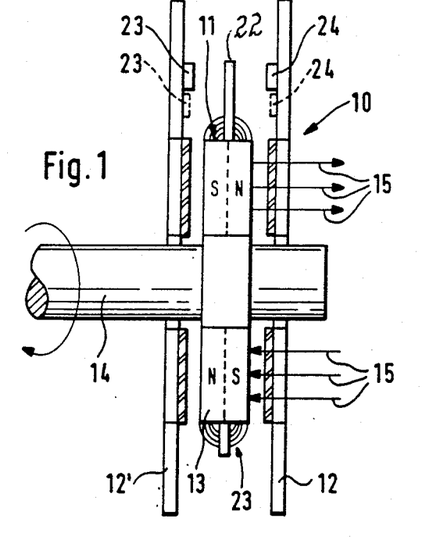
FIG. 1 shows a side view of a first embodiment of the unit combining position-sensing means and a tachogenerator.

In the case of the embodiment illustrated in FIG. 1, the driven magnetic rotor of the combined unit comprising the tachogenerator 10 is designated by reference numeral 11 and coacts in axially layered arrangement with at least one stationary coil-carrier disk 12.

For determining the position in connection with the combined solution of a tachogenerator (the latter will be described in detail further below), a ca;: disk 22 consisting of a magnetically permeable material (iron disk) is fixed on the rotor, preferably in a central position, while inductive transmitter heads 23 and inductive receiver heads 24 are provided in axially opposite positions, and properly aligned relative to each other, on carrier plates 12, 12' arranged on both sides so that when the cam disk 22 rotates the said heads face each other in fully or partially screened, or in fully exposed relationship, depending on the shape and rotary position of the cam disk 22. To say it in other words, the iron disk forming the cam disk 22 interrupts or releases the free path between the transmitter and the receiver heads 23, 24 in the manner of an aperture diaphragm, the transmitter and the receiver heads being designed as ferrite heads operating on an inductive basis, similar to known proximity switches. Accordingly, an alternating magnetic field is generated in each of the transmitter heads, which during rotation of the cam disk 22 is masked to a greater or lesser degree so that it is no longer received at all, or is received only in very weak form, by the receiver head.

This means properly speaking that the receiver head or heads receive an image of the movement of the magnet rotor, the magnetically permeable material (iron) of the cam disk 22 providing a greater or lesser screening effect.

As regards the type, number, structure and distribution of the transmitter and the receiver heads, as well as the shape of the cam disk 22, these may generally be selected according to the particular requirements. The illustrated embodiment uses three transmitter heads and, accordingly, three receiver heads 23, 24 which—as will be seen from the representations of FIG. 2 and FIG. 4, in connection with the cam disk 22—are distributed over the circumference of the magnet rotor in such a manner that in the rest position, for example, one pair of transmitter and receiver heads is not masked at all, another one, for example the one following in the sense of rotation, is fully masked, and a third one, again viewed in the sense of rotation, is masked in part, due to the special shape of the cam disk 22. This condition is repeated cyclically when the shape of the cam disk 22 is designed, for example, in the manner represented in FIG. 4, i.e. when its basic shape resembles that of an isosceles, for example with rounded edges and sides which are a little bulged.

Figure 4:
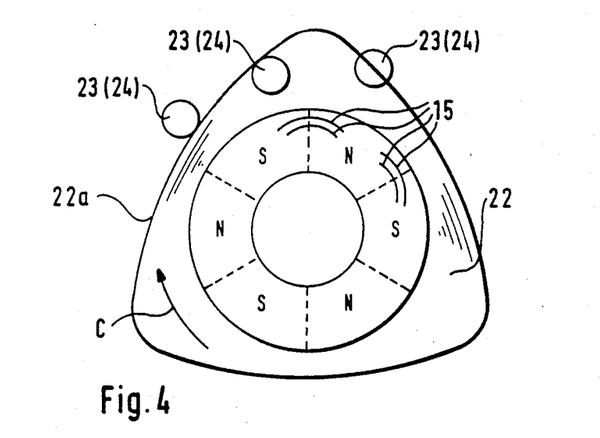
FIG. 4 shows a top view of the rotor which consists of a magnetic material and is provided on its periphery with an additional position-sensing cam disk, illustrating, in connection with the representation of FIG. 1, also the arrangement and interrelation of the individual poles.

It is easily seen that, when the inductive transmitter and receiver heads are distributed as shown in FIG. 4, the first pair of transmitter/receiver heads, viewed in the sense of rotation indicated by arrow C, is masked by the moving edge 22a initially only in part, then fully, while at the same time the next following pair is initially masked in part, then released in full, and the last pair is fully masked.

Figure 5A:
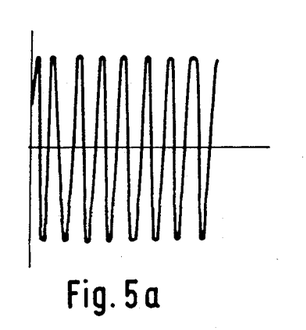
FIGS. 5a and 5b illustrate by way of diagrams the development of the supply voltage (FIG. 5a) supplied to inductive transmitter heads for position-sensing purposes, and the development of the signal received by separate inductive receiver heads, after modulation by the influence of the magnetic cam disk.
Figure 5B:
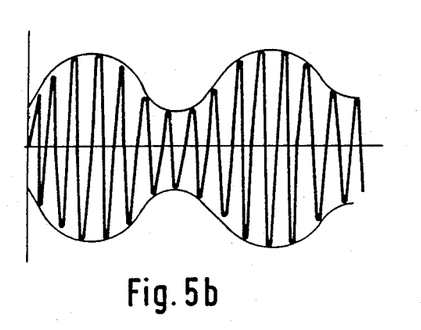

The output signal of each receiver head, therefore, consists of an output voltage modulated by an envelope corresponding to the representation of FIG. 5b, when the associated transmitter head is supplied with an alternating signal of constant amplitude and a frequency of, for example, 20 KHz (FIG. 5a). The modulation of the signal received provides an image of the rotary movement, at least of the relative rotary movement. One then knows, for example, which coils of a driving primary machine have to be excited and/or the output voltage roof curves of which coils of the tachogenerator have to be clipped according to FIG. 3 for the purpose of arriving at a common d.c. voltage proportional to the rotary speed. This will be explained in greater detail further below. By "relative position" it is understood in this connection that certain machines have repeating geometrical structures, depending on their number of poles. In these cases it is not important to know the absolute angular position within the given 360°, but it will absolutely suffice to have information regarding the position of repeating, i.e. insofar similar, poles relative to specific coils.

The systems involved being usually three-phase a.c. systems, one therefore arrives at the triangular design of the cam disk 22 also on this basis. It goes, however, without saying that in the case of other multi-phase systems and quite generally in the case of other driving systems, for example if one wishes to know the absolute position of the rotor, other distribution patterns of the inductive transmitter and receiver heads are of course also possible.

The modulated output voltages of the receiver heads 24 according to FIG. 5b may be supplied, for further electronic processing, for example to threshold circuits which respond to certain positions of the envelop shape and initiate corresponding switching or control operations, or the like. It is also possible to provide phase-comparator circuits which then detect and evaluate the phase position of the envelopes relative to each other.

There is still another aspect that deserves attention. Apart from the fact that the special arrangement of the inductive transmitter and receiver heads also permits to determine the sense of rotation, namely by detecting and comparing the modulated output voltages supplied by the transmitter heads, and their relative phase positions, the shape of the envelope obtained also enables a so-called auxiliary commutation signal to be derived for the driving machine. This is due to the fact that for achieving optimum efficiency, the electric machines cannot or should not be commutated with a purely sinusoidal curve, i.e. controlled with correspondingly sinusoidal currents, because the magnets and fields involved are distorted. For, if one proceeds from a corresponding, geometric distortion or variation in shape of the cam disk 22 which finally affects the modulation of the envelop and is, therefore, insofar changed it is also possible, without the initially purely sinusoidal modulation, to produce other shapes, too, which then are the image of the desired or necessary commutation characteristic for the driving electric motor. Such an auxiliary commutation characteristic derived from the changed envelope signal may then also serve as regulating signal, i.e. as reference value for the current regulator of the driving electric machine. The regulator for the current supply of the driving motor then makes use of the envelope signal changed in this manner at least as a correction value for the currents to be supplied to the machine. Due to the use of inductive transmitters and receivers for determining the position, in conjunction with a cam disk, the invention therefore provides possibilities which go far beyond the mere derivation of a position-indicating signal.

For forming the tachogenerator, the rotor 1 comprises an annular disk 13 of a magnetic material, with a central bore for receiving the shaft 14 on which the rotor is seated and by which it is driven. The shaft 14 may also consist of the output shaft end of an associated electric machine or another rotary drive whose rotary speed and possibly also rotary-angle position are to be determined.

The manner in which the shaft 14 carries the magnet rotor 11 need not be described here in detail, being not the subject of the invention. Similarly, it is not necessary to describe at this point the manner in which the at least one, according to a preferred embodiment the two coil carrier disks 12, 12' are supported. Preferably, they are located inside a suitable housing (not shown).

The material of the magnet rotor 11 may be a suitable magnetic sintered material. The magnetization of the magnet rotor 11 is such that—as will be understood best with reference to the representation of FIG. 1—north and south poles are arranged in alternating distribution about the circumference of each disk surface 13 so that star-shaped magnetization is obtained and certain disk segments form north and south poles in alternation succession, while on the other side of the annular disk 13 disk segments distributed similarly over the circumference form north and south poles, again in alternating succession but so that each pole positioned at a predetermined angle is (necessarily) opposed by the corresponding counter-pole on the other outer surface, as can be seen best in the representation of FIG. 1. Such special magnetization forms can be produced by suitable iron yoke shapes. However, this need not be described here in detail because the nature, structure and distribution of the poles about the aperture or annular disk 13 forming the magnet rotor 11 are clearly illustrated in the representation of FIGS. 1 and 4.

For the measuring process performed by the tachogenerator, those magnet lines are of importance which leave the magnet rotor axially (and when coil carrier disks 12, 12' are arranged on both sides of the magnet rotor 11) on both sides of the magnet rotor and which then enter again the adjoining pole segments. An attempt at illustrating corresponding magnet lines has been made at 15 in FIG. 4. For inducing the desired voltages in the coils (this aspect will be described in greater detail further below) the invention, therefore, makes use only of those magnet lines which leave the annular surfaces of the magnet rotor 11 in the axial direction, while it makes no use of any magnet lines closing from both sides across the outer or inner marginal edges, although there magnet lines are (necessarily) also encountered because it is a fact that opposite poles must (of course) be arranged opposite each other on the same angle segment of the angular disk 13, as one pole alone can never exist.

Figure 3:
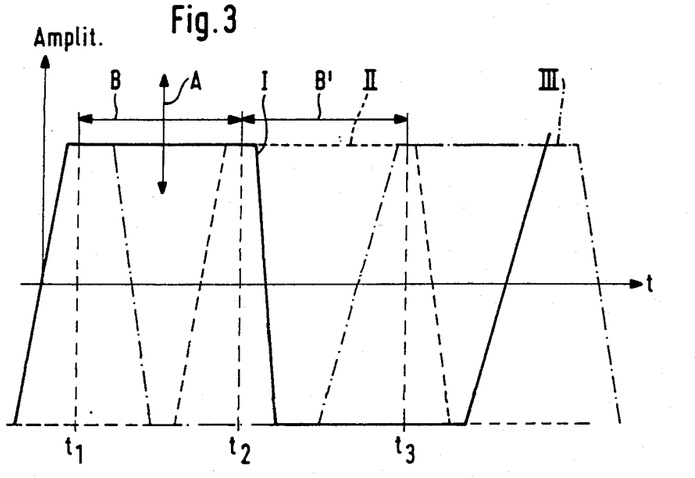
FIG. 3 shows a diagram of a possible shape of the curve of the phase voltages supplied by the coils, as a function of time.

It is understood that particular magnetization characteristics, i.e. for example the strength of the magnetization field in the individual poles of the magnet rotor, are adapted to the desired curve shape of the output voltage so that a doubled overall effect is obtained in connection with the special coil shape, which finally leads to the shapes of the output voltage curves (EMF induced in the coils) shown in FIG. 3.

Figure 2:
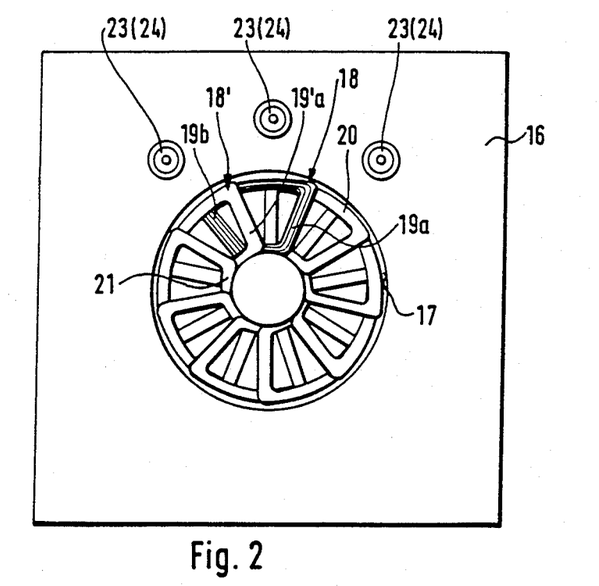
FIG. 2 shows a top view of the at least one coil carrier disk, with the arrangement of the coils and of the position-sensor heads.

The oppositely arranged coil carrier disks 12, 12', which are separated by the magnet rotor 11, are insofar symmetrical and built up in the same manner so that it is absolutely sufficient to describe the structure of only one coil carrier disk with the associated coils, with reference to the representation of FIG. 2. A carrier consisting, for example, of a rectangular—as shown in FIG. 2—or a circular disk of a suitable, possibly magnetically and electrically inert (plastic) material is designated by reference numeral 16 and carries flat coils 11 which are adapted to the annular shape of the magnet rotor 11, but preferably inserted in a central circular opening 17, in the manner a spoked wheel may be inserted in a surrounding running tread.

It has been found in this connection that for achieving the best possible results each individual coil should present a substantially trapezoidal shape, which means that—as described in connection with the coil 18 in FIG. 2—in should comprise two oblique lateral parts 19a, 19b, which will be described hereafter as spoke-like webs, as well as a longer base web 20 and a shorter connecting web 21.

In order to build up the shape of a wheel from this coil shape, the longer base webs 20, which have been described above also as roof webs, are arranged towards the outside, i.e. towards the larger circumference of the circular structure.

The coils overlap each other and are assembled and connected, preferably by gluing, in this fan-like annular shape so as to provide the form of a complete wheel, with the partially overlapping inner connecting webs 21 forming the hub, the oblique lateral webs 19a, 19b forming the spokes of the wheel and the assembled and partially overlapping longer base webs 21 forming the hoop-like periphery. The entire annular structure of the flat coils is then mounted in the circular opening 17 of the coil carrier disk 16. In addition, the total arrangement of the coils in the form of the described wheel provides the following particularities. Due to the overlapping arrangement, each coil—in the representation of FIG. 2 the coil 18', overlaps the rear third of the preceding coil 18 by its forward spoke-like web 19a' so that the rear spoke-like web 19b of each preceding coil 18 is visible only through the inner, likewise trapezoidal coil opening, while the shorter connecting web (adjoining the hub) and the upper longer base web (forming the periphery of the wheel) rest fully on the corresponding connecting and base webs of the preceding coil.

Figure 2A:
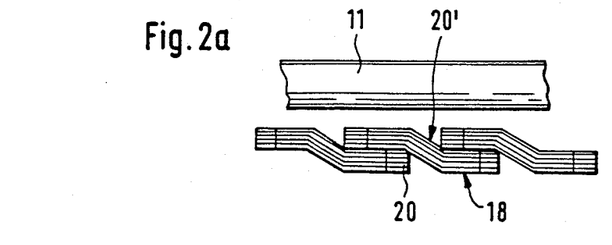
FIG. 2a shows a detail of the layered arrangement of the coils and the mutually overlapping portions in the peripheral area of the "coil wheel"

In order not to obtain a stepped structure, but ensure that the wheel shape of the overall coil structure remains in one plane, each coil is positioned somewhat obliquely in the circular opening 17, as will be easily understood, because the forward part of each coil rests on the rear part of each preceding coil. The rear part of each coil is, therefore, somewhat depressed by the following coil—starting out from the top view of FIG. 2—while the leading part seems to be somewhat raised because it rests on the rear part of the preceding coil. Regarding the whole arrangement in a different way, one may also say that each coil seems to be bent off in the central portion of the connecting or base web, at the transition between its forward and rear parts. This central portion, therefore, serves as connection between a raised coil portion and a depressed coil portion so that each coil has certain portions arranged in two, of course closely adjacent, planes. This coil configuration can also be used for optimizing the final shape of the measured-value output voltage by empirical tests, and for subjecting it to final correcting influences. FIG. 2a illustrates this layered arrangement of the coils by way of the peripheral base webs 20 and their bent-off portions 20'.

The individual coils can be produced in the usual manner by winding them about a corresponding trapezoidal/angular arbor, although for the purposes of the present invention they have to be pressed into shape thereafter in order to bring them, and in particular the base web 20, which is of considerable importance for the straight linearized roof shape of the voltage curves according to FIG. 3, into the proper shape which actually results in the desired output voltage curves. A particularity of the invention actually consists in the fact that the base web 20 does not follow the circular shape of a wheel and/or of the opening 17 in the carrier disk 16, but exhibits a clearly straight, i.e. somewhat inwardly depressed shape so that the desired output voltage curve according to FIG. 3, i.e. the desired roof shape, can be achieved by the nature of the fields emanating from the magnet rotor 11 during its rotary movement, in combination with the fact that the base webs 20 of each coil are (still) in the magnetically active area which is intersected by the field lines of the magnet rotor.

In FIG. 3, the curves of three phase voltages, set off against each other by 120°, are shown. The base webs 20 of each coil provide notable shares of the EMF produced by each coil—substantially corrective components for the roof shape of the linked output voltages, which in FIG. 3 are represented as three-phase voltages.

It should be noted here expressly that the flat linear and—as has been explained repeatedly—desired straight roof shape of the output voltages, as shown by the diagram of FIG. 3, is not achieved by limiter action or by clipping by means of diodes or the like, but is directly the result of the geometric and structural conditions of the flat-coil arrangement, the shape of the coils and the shape of the axial magnetic field lines of the rotor 11. This also means that any change in the rotary speed will also cause the roof voltage level, i.e. the voltage level determined by the roof shape of the flat coils which, in the embodiment shown, constitute a three-phase a.c. system, to change proportionally, i.e. to rise or drop as indicated by arrow A. Whilst all hysteretic effects or other disturbing influences resulting therefrom are avoided due to the ironless construction (detection of the magnetic fields emanating from the magnet rotor 11 by the nature, shape, structure and number of the coils, directly and without any iron) the main EMF is obtained in the straight spoke-like webs 19a, 19b while counter-voltages may be induced also in the roof slopes of the flat coils, i.e. in the base webs 20 and, if desired, also in the connecting or hub webs 21, which then contribute towards the desired pulse shaping action: electric output pulse shaping by coil shaping. The offset of the coils relative to each other, and the number of coils, is determined by the number of poles of the magnet, which is in principle freely selectable. If the magnet rotor consists of a six-pole excitation magnet, as in the illustrated embodiment, then the existing coils can be connected to three phase windings so that—regarding again the illustrated embodiment which is, however, not to be regarded as restricting the invention—the following connections are obtained in the case of nine flat coils: The first, fourth and seventh for forming the first phase voltage, indicated in the diagram of FIG. 1 by I and represented by the full line; the second, the fifth and the eighth coil for forming the second phase voltage of the three-phase a.c. system (voltage curve II in FIG. 3, indicated in broken lines); and the third, sixth and ninth coil for forming the last phase voltage (indicated in the diagram of FIG. 3 by the dash-dotted line III).

Another contribution towards forming the output voltage is provided by the special nature of the magnetization of the individual poles of the magnet rotor 11. For example, a strong magnetization is sought in the central portion of the segment, while the magnetization is kept weaker in the marginal areas. Such different magnetization strength may be achieved—this is not shown in the drawing—by a special design of the magnetization means for the magnet rotor 11, for example by giving the yoke used for the magnetization process a corresponding, special shape and by determining the saturation areas in the magnetization yoke in such a manner that the desired axial direction of the magnet lines is obtained in the magnet rotor. These conditions are described at such length because, finally, empirical steps are required in connection with the determination of the particular output curve shape according to FIG. 3, if optimum results are to be achieved. Altogether, the roof curve, which is of interest for the present purposes, can be optimized by the following two parameters, namely
1. the geometry of the flat coils and
2. the configuration of the magnetization lines in the magnet rotor.

The invention then makes use only of additional electronic means for cutting out certain roof curve sections from the trapezoidal voltages supplied by the coils, it being possible for these purposes to select the cut-out sections, for example, as indicated by arrow B in FIG. 3 which means that the roof sections can be clipped practically to provide a continuous line which is perfectly straight. In order to determine the loci, or better the moments $t_1$ and $t_2$, or $t_2$ and $t_3$, etc., for clipping the roof sections, one makes use of the position-sensing method described above.

Another advantageous embodiment of the present invention provides that the system is also capable of reacting to variations in the distance of the supporting means, which may possible occur, i.e. to any axial displacement of the magnet rotor 11 relative to the stationary coil-carrier plates 12, 12' in a manner to correct any such variations perfectly, although such variations in distance have a considerable influence on both shape and value of the output voltages if, as in the present case, only the axially emanating magnetization lines are evaluated.

This partial problem is solved by arranging two coil-carrier plates 12, 12', carrying coils in the described manner, on both sides of the magnet rotor 11 so that a differential arrangement is provided which generally ensures that if the one coil arrangement receives a smaller amount of magnet lines, due to any variation in the axial distance, this amount is additionally applied to the other coil arrangement so that any variations in the distance, i.e. any axial displacement of the magnet rotor 11, is balanced out if the coils mounted on the coil-carrier plates 12 and 12' are connected in a suitable manner. This also simplifies considerably the (initial) adjustment of the system. Another advantage of such a differential arrangement, which is derived from the known induction laws, is seen in the fact that any distortions resulting in the output voltages of the coils due to the sense of rotation, are also balanced out since—as will be easily understood—one coil arrangement can be connected in such a manner that—to say it i simple words—it perceives the inductive effects of the magnetic rotor 11 as being directed in the one sense when the other coil arrangement perceives the same effects as being directed in the other sense, and vice versa. This can be achieved, for example, by directing the overlapping portions of the coils in clockwise or counter-clockwise direction. If the rotor then reverses its sense of rotation, the only thing that happens is a reversal of the conditions and corrective influences existing at the coils.

The invention, therefore, also permits to determine the rotor position, not only for the purpose of clipping the output voltage roof curves, but also with respect to the rotor of the electric machine driving the tachogenerator, which may for example have the general design of a synchronous machine and the function of a brushless d.c. motor, so that specific coils can be excited at specific moments in time by electric circuits (current regulators), rather than —as heretofore usual—by means of a mechanical commutator.

Conveniently, the number of poles of the tachogenerator should be adapted to, i.e. conform with, the number of poles of the driving electric machine. Accordingly, a six-pole driving machine would require a tachogenerator of the type described, while an eight-pole or twelve-pole electric machine should conveniently be designed as eight-pole or twelve-pole tachogenerator, already for enabling the position sensing operation to be carried out correctly. If a three-phase system is obtained in the case of the driving electric machine, then a minimum number of three inductive transmitter/receiver heads will be required for position sensing, while in the case of an eight-pole machine four transmitter/receiver heads will be required, etc.

The arrangement of the cam disk 22 on the magnet rotor offers an additional preferred effect in that the stray fields emanating from the magnet rotor 11 due to its own magnetization (marginal edges) might under certain circumstances influence the transmitter/receiver heads of the position-sensing system, and the aperture disk or cam disk 22 acts in this respect in the manner represented at 23 in FIG. 1: Due to its magnetically permeable structure, the cam disk will short-circuit these fields so that these axially extending magnetic lines are prevented from influencing the position-sensing system and, besides, also from influencing the flat coils of the tachogenerator in an undesirable way.

All features mentioned or shown in the above description, the following claims and the drawing may be essential to the invention either alone or in any combination thereof.

I claim:

1. A device for determining the rotary-angle position of rotary drives of electrical machines whereby electrical voltages are generated and evaluated by sensors responding to the rotary movements comprising:

a plurality of at least three adjacent pairs of oppositely disposed transmitter and receiver heads, each said pair forming an inductive sensor arrangement and arranged in coaxial alignment;

a cam disk concentrically mounted with respect to the rotary drives and rotatably disposed between said transmitter and receiver heads, said cam disk having a curved shape configured so at a given position it simultaneously fully screens at least a first pair of said transmitter and receiver heads from each other, partially screens at least a second pair of said transmitter and receiver heads from each other, and fully exposes at least a third pair of said transmitter and receiver heads.

2. Device according to claim 1, characterized in that said transmitter heads and receiver heads are arranged on carrier discs.

3. Device according to claim 1, characterized in that the cam disc consists of a magnetically permeable material.

4. Device according to claim 1, characterized in that the inductive transmitter heads are composed of ferrite material and are supplied with a higher-frequency supply voltage, which is envelope-modulated, according to the shape and rotary speed of the cam disc in the output signal received by the receiver heads, the determination of the rotary position is derived from the respective envelopes of the pairs of transmitter heads and receiver heads and their relative phase position.

5. Device according to claim 4, characterized in that the envelope supplied by at least one of the pairs of inductive transmitter/receiver heads is used simultaneously as auxiliary commutation characteristic for exciting the different coils of a driving machine and that, when deviations from a sinusoidal commutation characteristic are required, the cam disc (22) determining the envelope shape has a shape adapted to the momentary shape of the commutation characteristic.

6. Device according to claim 2, characterized in that the cam disc (22) is seated on a magnet rotor (11) of a speed-sensing arrangement and that the stationary carrier discs carrying the transmitter and receiver heads (23, 24) carry at the same time, on at least ore side of the magnet rotor, a ring of flat coils seated axially before the magnet rotor.

7. Device according to claim 6, characterized in that the driven magnet rotor (11) consists of a permanently magnetic material provided with a main magnetization in the axial direction which is actively connected with radially extending primary phase windings of flat coils (18), for determining the rotary speed.

8. Device according to claim 7, characterized in that the spoke-like webs of the flat coils are interconnected, for correction of the output voltage curve, via tangentially extending upper and lower phase windings, with each flat coil exhibiting a basically trapezoidal shape, and that at least the base webs which form the periphery of the wheel, are located within magnetically active areas of the magnet rotor.

9. Device according to claim 8, characterized in that the annular magnet rotor (11) is subdivided in star shape into a predetermined number of pole-forming segments so that an alternating succession of north and south poles is obtained on each axial annular surface, which are opposed by corresponding south and north poles provided on the opposite outer annular surface, and that the trapezoidal flat coils are arranged in such a manner that their main plane extends in parallel to the annular surface of the magnet rotor (11), at least on one side, so that the main EMF is induced in the spoke-like webs (19a, 19b) of each flat coil, while corrective voltages are induced in the peripheral parts of the coil windings, for influencing the roof curve of the trapezoidal output voltages of the individual coils belonging to a multiphase system.

10. Device according to claim 8, characterized in that the trapezoidal coils (18) are arranged on the at least one coil carrier disc (12, 12') in a fan-like overlapping arrangement and in a generally circular or annular shape so that the succession of coils forms a generally wheel-like shape with the oblique lateral parts of the trapezoidal coil shape forming the spoke-like webs (19a, 19b), the base webs (20) forming the outer periphery of the wheel, and the inner connecting webs (21) forming the hub opening of the wheel.

11. Device according to claim 10, characterized in that the flat coils (18) overlapping each other in fan-like arrangement are provided in such a manner that each forward coil part overlaps the rearward part of the following coil and has its own rearward part overlapped by another coil, while at least the intermediate portion of the coil extends obliquely relative to the main plane of the wheel formed by coils.

12. Device according to claim 6, characterized in that the coils are interconnected for forming a three-phase system.

13. Device according to claim 12, characterized in that the number of the magnet poles of the magnet rotor (11) is adapted to the number of poles of the driving electric machine and that the number of the coils (18) is at least equal to the number of magnet poles, or to a multiple thereof, and that the output connections of the coils assigned to each phase voltage are interconnected.

14. Device according to claim 6, characterized in that in the case of six magnet poles distributed evenly over the annular shape of the magnet rotor (11) nine flat coils (18) overlapping each other in fan-like arrangement are provided, the first, fourth and seventh flat coil being assigned to a first phase voltage, the second, fifth and eighth flat coil being assigned to a second phase voltage, and the third, sixth and ninth flat coil being assigned to a third phase voltage for forming a three-phase system.

15. Device according to claim 14, characterized in that the upper base webs (20) of each coil (18) are shaped according to the desired roof curve shape of the respective phase voltage.

16. Device according to claim 15, characterized in that for the purpose of obtaining a generally angular outer wheel contour, the upper base webs (20) are pressed inwardly against the peripheral circular shape and extend substantially along a straight line.

17. Device according to claim 10, characterized in that the overlapping flat coils (18) which are connected to each other are inserted into a circular opening (17) in the coil carrier disc (12, 12') without any yoke structures being used.

18. Device according to claim 15, characterized in that apart from the special shaping and configuration of the base webs (18) serving for correcting the roof shape of the output voltage, the field lines of the individual poles of the magnet rotor (11) emanating axially from the rotor surfaces, are defined and configured in such a manner that they also contribute towards forming a linearized, straight output roof curve of the individual voltages.

19. Device according to claim 18, characterized in that in order to avoid influences of the sense of rotation and of variations of the axial distance on the output curve shape, coil carrier discs (12, 12') carrying the flat coil arrangement are provided on both sides of the magnet rotor (11) and that the associated coils are suitably connected within the multi-phase system to provide a differential arrangement for balancing out any disturbing influences.

20. Device according to claim 15, characterized in that partial sections are clipped the roof curve of the individual phase voltages of the multi-phase system at points in time derived from a position-sensing system, and are composed to a direct voltage proportional to the rotational speed.

21. Device according to claim 2, characterized in that the number of poles of the magnet rotor (11), the number of flat coils (18) arranged of the magnet rotor (11), and the number of pairs of transmitter/receiver heads belonging to the position-sensing system are adapted to each other and, under certain circumstances, also to the number of poles of the driving electric machine.

22. Device according to claim 21, characterized in that the magnet rotor (11) is provided on each side of its annular surfaces with six poles alternating as north poles and south poles and that for forming a three-phase system nine flat coils (18) are provided in overlapping arrangement: on at least one side of the magnet rotor, that at least three pairs or inductive transmitter/receiver heads are arranged within an angular segment, in a generally circular shape, and that in the case of a usual three-phase system the cam disc (22) has the basic general shape of an isosceles.

23. A device as recited in claim 1, wherein the cam disk is disposed on a magnet rotor of a tachnogenerator for determining the rotary speed of the machine.

24. A device as recited in claim 1, wherein said cam disk is substantially isosceles-triangular in shape.

* * * * *